F. N. EMLEY.
VEHICLE SPRING.
APPLICATION FILED SEPT. 21, 1908.

915,337.

Patented Mar. 16, 1909.

Witnesses
M. C. Lyddane
R. H. Krenkel

Inventor
Frank N. Emley
By Joshua R. H. Potts
Attorney

UNITED STATES PATENT OFFICE.

FRANK N. EMLEY, OF CREAMRIDGE, NEW JERSEY.

VEHICLE-SPRING.

No. 915,337.      Specification of Letters Patent.      Patented March 16, 1909.

Application filed September 21, 1908. Serial No. 454,017.

*To all whom it may concern:*

Be it known that I, FRANK N. EMLEY, a citizen of the United States, residing at Creamridge, in the county of Monmouth and State of New Jersey, have invented certain new and useful Improvements in Vehicle-Springs, of which the following is a specification.

My invention relates to wagon springs and more particularly to a combination spring for vehicles wherein a plurality of springs shall act in succession according to the load which is placed upon the vehicle.

The object of my invention is to provide a spring of this character wherein one of the spring elements shall be normally out of action, unless a heavy enough weight is placed thereupon to compress the other of the spring elements in which case both of the elements will be brought into action, and both will resist the weight or pressure placed upon them.

The invention consists in providing a vehicle axle with a spring adapted to sustain an ordinary load to which spring is attached another spring adapted to be brought into contact with the axle and under tension when the first named spring has been sufficiently depressed.

Figure 1:
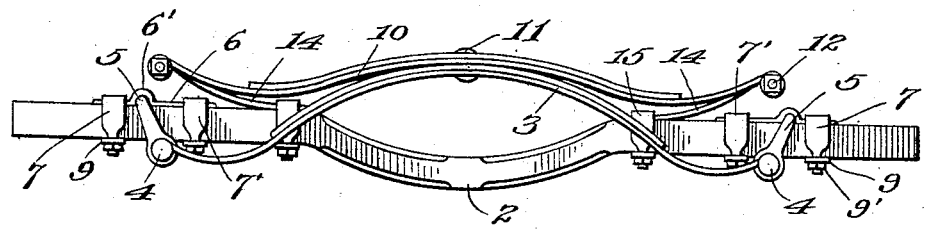
Figure 2:
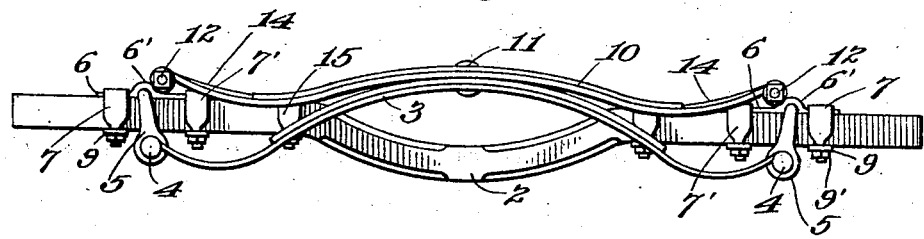
Figure 3:
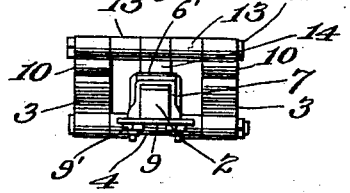
Figure 4:
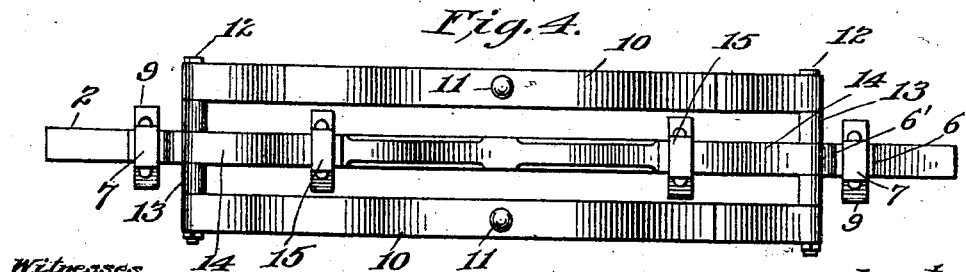

In the drawings I have illustrated an embodiment of my invention and therein Figure 1, is a side view of an axle with my combination springs attached thereto. Fig. 2, is a side view of the same under the effect of a heavy load. Fig. 3, is an end view of Fig. 1, and Fig. 4, is a plan view thereof.

In the drawings 2 designates a vehicle axle preferably downwardly bowed at its middle, in order that it may not come in contact with the bolster of the vehicle. The primary spring element of my combination is formed of springs 3. These are bowed springs formed of two or more leaves and having their ends upwardly turned and then bent around the ends of shackle bolts 4. These bolts 4 extend beneath the axle and are held thereto by a U-shaped clip 5, whose ends are perforated for the passage of the shackle bolt 4.

The clip 5 is held to the axle by a plate 6, folded or bent to form an eye 6' to partly inclose the top of the clip and adapted to lie upon and be attached to the upper face of the axle end. This plate 6 is held to the axle end on each side of the clip 5 by U-shaped clips 7, 7', whose ends are screw threaded and pass through a plate 9. Nuts 9' engage with the screw threaded ends to clamp the clip down against the axle and thus hold the plate 6 in place. It will be seen that this construction prevents the clip 5 from moving laterally along the axle while allowing it to turn slightly in the eye 6'.

The primary spring element acts in all respects like the ordinary spring under a light load, but it is relatively light, and hence alone would not properly support a heavy load. I therefore combine with it the secondary spring element likewise composed of leaf springs 10 of ordinary construction, but flatter, that is having a less degree of bow than the springs 3. The springs are attached at their middle to the springs 3 by bolts or rivets 11, and the ends extend upward above the plane of the axle 2 and normally in the position shown in Fig. 1.

By reference to Fig. 3, it will be seen that the primary element is composed of two sets of springs 3, arranged parallel to each other on each side of the axle 2, and that there are two sets of springs 10 also parallel to each other, and superposed upon the springs 3. I do not wish however to be limited to this, as each element might be composed of one set of springs alone, or a greater number than two sets. At its ends each spring 10 of the secondary element is bent around a shackle bolt 12 by which the two springs 10 on either side are connected together.

Spacing washers 13 are arranged on bolt 12 between the spring elements to hold them apart. Preferably in order to reinforce and assist the element 10 I provide auxiliary springs 14 which engage at one end with the middle of the shackle bolt 12, and the other ends are made fast to the axle 2 inward of the clips 7' by clips 15 of the same character as the clips 7, 7'.

It will be seen from Fig. 1, that the washers 13 separate the ends of the springs 10 from the auxiliary springs 14, thus acting to space the springs from each other, and in connection with the bolts 12 to hold them rigidly in place.

The operation of my device is as follows: Under ordinary circumstances only the springs 3 come into play, the ends of the springs 10 remaining in the position shown in Fig. 1. When however, a greater weight is placed upon the springs, it causes the springs 3 to be forced downward, until the ends of the springs 10 contact with the upper surface of the axle. Both of the springs 3 and 10 will then be brought into action to support the load, and the total effect will be that of a spring of four leaves instead of a spring of two leaves.

It is obvious that in place of two springs having about the same amount of tension, I might make one of the springs considerably stronger than the other, but I have found by experiment that it is ordinarily sufficient to have the springs 10 of the same strength as the springs 3.

I do not wish to be limited of course to the application of this spring, as it might be used for all manner of vehicles, and indeed in any situation wherein springs of this character would be of value. Neither do I wish to be limited to the exact manner whereby the springs are attached to the axle, nor to the use of the auxiliary springs 14, as these might be omitted without departing from the broad idea of my device.

Having thus described my invention what I claim as new and desire to secure by Letters Patent is:

1. A vehicle spring consisting of a plurality of spring elements superposed one upon the other, the lower of said springs being attached normally to the axle, the uppermost spring element being normally out of contact with the axle but adapted to contact with the axle and to be placed under tension when the springs are depressed.

2. In a vehicle, an axle having its central portion bowed downwardly, a primary spring element consisting of two parallel multi-leaved springs upwardly bowed at their center and attached at their ends to shackle bolts, pivoted clips through which said shackle bolts pass, means for attaching said clips to the axle, a secondary spring element comprising two parallel multi-leaved springs of a less degree of curvature than the springs of the primary element, the ends of said secondary springs being upwardly turned above the upper face of the axle, shackle bolts connecting the ends of said secondary springs, auxiliary springs connected to the middle of said shackle bolts and extending downward to the face of the axle, clamps for attaching the ends of said auxiliary springs to the axle and spacing washers interposed between said auxiliary springs and said secondary springs.

3. In a vehicle, an axle having a downwardly bowed central portion, a primary spring element composed of two parallel multi-leaved upwardly bowed springs, shackle bolts passing beneath the ends of the axle around which the ends of said primary springs are bent, U-shaped clips engaging over the axle through which said shackle bolts pass, plates holding said clips to the face of the axle, clips clamping each of said plates to the axle end, a secondary spring element composed of two parallel multi-leaved upwardly bowed springs having a less degree of curvature than the springs of the primary element, the ends of said springs being upwardly turned and normally extending upward to a point above the upper face of said axle, shackle bolts connecting the ends of said springs, auxiliary springs each of which has one end engaging around its adjacent shackle bolt, spacing washers between said auxiliary springs and the said secondary springs and clips engaging over the ends of said auxiliary springs and around said axle and clamping said auxiliary springs to the axle.

In testimony whereof I have signed my name to this specification in the presence of two subscribing witnesses.

FRANK N. EMLEY.

Witnesses:
 ROY EMLEY,
 CHARLES G. EMLEY.